United States Patent Office.

ARTHUR WEINBERG AND HANS SIEBERT, OF MAINKUR, NEAR FRANKFORT-ON-THE-MAIN, ASSIGNORS TO LEOPOLD CASSELLA & CO., OF FRANKFORT-ON-THE-MAIN, PRUSSIA, GERMANY.

PRODUCTION OF A NEW NAPHTHYLAMINE-MONOSULPHONIC ACID.

SPECIFICATION forming part of Letters Patent No. 362,560, dated May 10, 1887.

Application filed November 15, 1886. Serial No. 218,922. (Specimens.) Patented in France October 11, 1886.

*To all whom it may concern:*

Be it known that we, ARTHUR WEINBERG and HANS SIEBERT, citizens of the Kingdom of Prussia, and residents of Mainkur, near Frankfort-on-the-Main, Germany, have invented a new and useful Improvement in the Manufacture of Color-Producing Acids, of which the following is a specification.

Our invention relates to the production of a new color-producing acid obtained from naphthaline, as will be hereinafter described and claimed.

In producing this new acid we proceed as follows: We mix one part of alphanaphtha-line-disulphonate of sodium with one to four parts of caustic soda of fifty per cent., and heat the mixture to about 200° centigrade, until it has become quite consistent, and a sample of the smelt dissolved in water and acidulated yields to ether traces of dioxynaphthaline. We dissolve the smelt in water, acidulate it with muriatic acid, and by strong boiling cause the sulphurous acid to escape. The aqueous solution, evaporated to about fifteen parts and cooled down, separates the soda-salt of a new naphthol-monosulphonic acid. Heated with ammonia the hydroxyl group of this acid is replaced by the $NH_2$ group. For this purpose we heat one part of the naphthol-monosulphonate of soda with two parts of ammonia of twenty per cent. $NH_3$ during six hours to 250° centigrade in an autoclave. When the product of the reaction is acidulated, the new naphthylamine-sulphonic acid separates in shining crystals.

In the first part of this process the quantity of alkali and the temperature may vary considerably, the caustic soda may be replaced by hydrate of potassium, and the naphthaline-sulphonate of soda by other salts of the same acid. The chief point is to interrupt the smelt when dioxynaphthaline is formed, in order to avoid the reaction of Ebert & Merz, (Berichte der Deutschen Chemischen Gesellschaft, vol. IX, page 612,) who, passing through the naphthol-monosulphonic acid, was not aware of its formation, and exclusively found dioxynaphthaline.

In the second part of our process we may as well start from the naphthaline-disulphonic acid and heat the same with $N_aOH$ and $NH_3$, or an ammonium salt, and proceed as above stated.

The aqueous solution of the salts of the new naphthylamine-sulphonic acid shows a violet fluorescence. The sodium salt is difficultly soluble in water and crystallizes easily. When strongly acidulated, the naphthylamine-sulphonic acid separates in crystals and gives, by addition of nitrite of soda, a clear solution of the diazo compound. This diazo compound can be combined with amines, phenols, and their sulphonic acids in the well-known manner. The dye-stuffs formed with the so-called naphthol-disulphonic acid R and alphanaphthol-monosulphonic acid are fine bluish scarlets, and the dye-stuff formed with alpha-naphthylamine dyes in alkaline solution a yellowish red.

What we claim as our invention, and desire to secure by Letters Patent, is—

As an article of manufacture, the new color-producing naphthylamine-monosulphonic acid, being a derivative of the new naphthol-monosulphonic acid obtained from the alpha-naphthaline-disulphonic acid, substantially as herein described.

In testimony that we claim the foregoing as our invention we have signed our names, in presence of two witnesses, this 30th day of October, 1886.

ARTHUR WEINBERG.
HANS SIEBERT.

Witnesses:
ALVESTO S. HOGUE,
JEAN GRUND.